United States Patent [19]
Ozaki

[11] Patent Number: 4,469,479
[45] Date of Patent: Sep. 4, 1984

[54] BICYCLE DERAILLEUR

[75] Inventor: Nobuo Ozaki, Osaka, Japan

[73] Assignee: Maeda Industries, Ltd., Osaka, Japan

[21] Appl. No.: 425,297

[22] Filed: Sep. 28, 1982

[51] Int. Cl.³ ............................................. F16H 11/08
[52] U.S. Cl. ..................................................... 474/80
[58] Field of Search .............................. 474/80, 78, 82

[56] References Cited

U.S. PATENT DOCUMENTS

| | | | |
|---|---|---|---|
| 3,402,942 | 9/1968 | Shimano et al. | 474/80 X |
| 3,979,962 | 9/1976 | Kebsch | 474/82 |
| 4,027,542 | 6/1977 | Nagano | 474/82 |
| 4,038,878 | 8/1977 | Dian | 474/82 |
| 4,384,864 | 5/1983 | Bonnard | 474/80 X |
| 4,406,643 | 9/1983 | Shimano | 474/80 X |

*Primary Examiner*—James A. Leppink
*Assistant Examiner*—Thuy M. Bui
*Attorney, Agent, or Firm*—Birch, Stewart, Kolasch & Birch

[57] ABSTRACT

A bicycle derailleur comprises a stationary member to be fixed to a bicycle frame, a first shaft integral with and extending from the stationary member, a spring-biased swing member pivotally supported at one end by the first shaft, a second shaft extending through the swing member at a position spaced apart from the first shaft in parallel relation with respect to the first shaft and in relatively rotatable relation with respect to the swing member, a movable member fixedly connected to and carried by the second shaft, and a restricting mechanism for restricting the second shaft from rotating about its own axis, so that a chain guide, which is operatively supported by the movable member, can move laterally with maintaining a certain constant positional relation with respect to a multi-speed driving gears of a bicycle.

12 Claims, 15 Drawing Figures

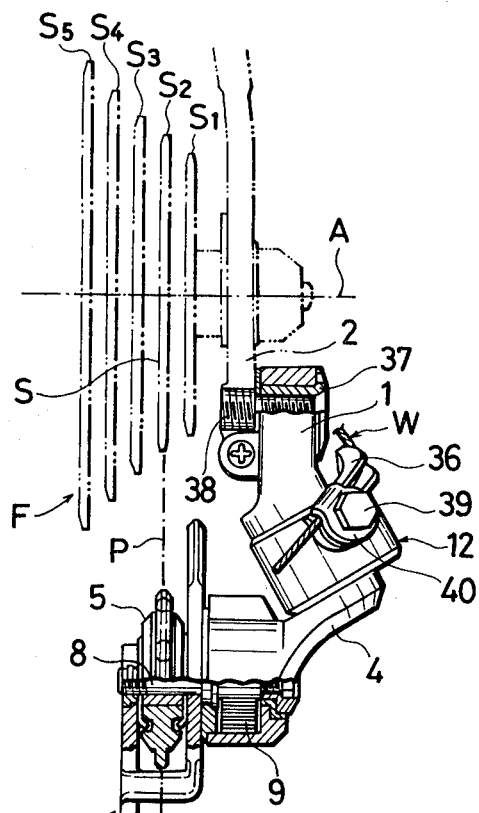
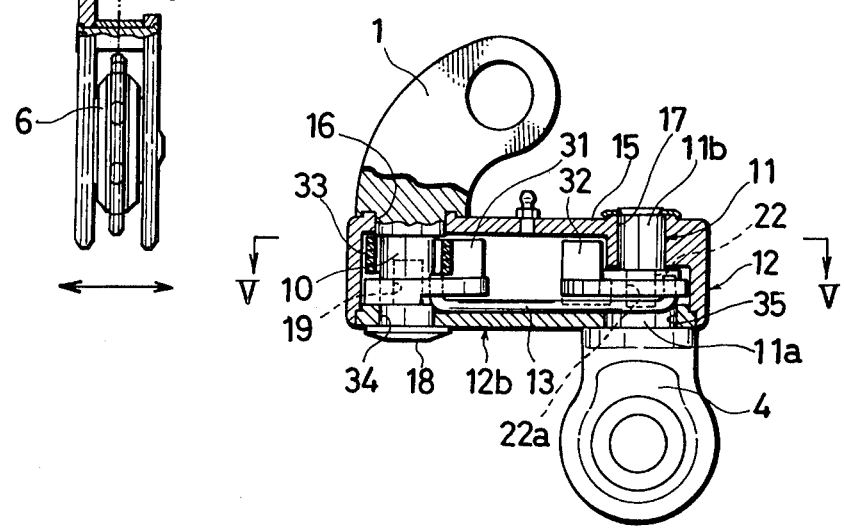

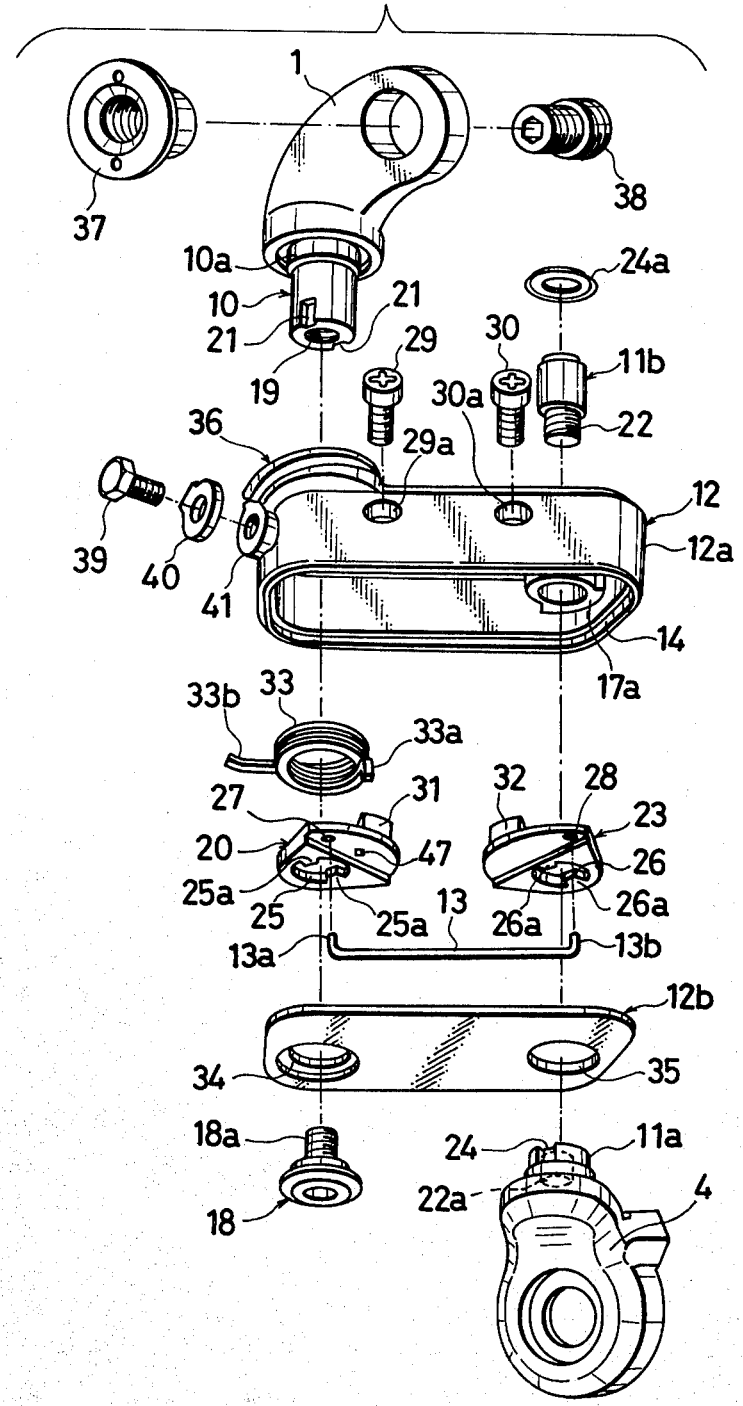

BICYCLE DERAILLEUR

BACKGROUND AND SUMMARY OF THE INVENTION

This invention relates to a bicycle derailleur, and more particularly to an improved derailleur structure applicable to a rear derailleur which is used for selectively shifting a drive chain from one sprocket to another sprocket of a multi-speed freewheel comprising usually three to eight different sized sprockets. The structure is also applicable to a front derailleur which is used for shifting the chain from one gear to another gear of a multi-speed chain wheel comprising usually two to four different sized gears.

The conventional rear derailleurs, that are now actually available in the commercial markets, generally have a parallelogram linkage mechanism for guiding the drive chain over a plurality of freewheel sprockets which are spaced axially along the axis of the rear wheel hub as disclosed, for example, in U.S. Pat. Nos. 3,979,962 to Kebsch, 4,027,542 to Nagano and 4,038,878 to Dian. As is well known in the field and as is illustrated in FIG. 11 of the accompanying drawing, the typical parallelogram linkage mechanism of the prior art rear derailleur is formed by four links, that is, a stationary link (a) fixed to a mounting bracket (not shown) known as a rear end plate of a bicycle frame, a pair of spring-biased parallel links (b1) (b2) pivotally connected at their one ends to the stationary link (a), and a movable link (c) which is opposite to the stationary link (a) and pivotally connected to the other ends of the links (b1) (b2) to support a known tensioner (e) which, in turn, carries a guide roller (d) and a known tension roller (not shown). The parallelogram is resiliently transformable by operation of a known Bowden-type control cable (f), which consists of an outer tubular sheath (g) and an inner wire (j) passing through the former, within a certain predetermined range, for example, from the solid line position to the phantom line position or vice verse as shown in FIG. 11, so that the tensioner (e) carried by the movable link (c) can move with always maintaining parallel relation with respect to each of a plurality of sprockets of a multi-speed freewheel, to effect the desired chain shifting over the freewheel sprockets.

The conventional parallelogram type rear derailleur has the following disadvantages. The first is that the four link members (a) (b1) (b2) (c), cooperating coil springs (not shown in FIG. 11), and other component elements are all exposed to rain and dust and naturally get rusty and dusty, which causes an obstacle to a desired smooth transformation of the parallelogram and a short span of life.

Another disadvantage is that the parallelogram linkage mechanism hinders a simple and compact design of the rear derailleur and therefore a good appearance of the derailleur cannot be attained.

A further disadvantage is that not a single or mono type control cable but an expensive double type control cable (f) known as a Bowden cable must be employed to transform the parallelogram linkage. More particularly, the parallelogram can be transformed by varying a length of its diagonals. For that purpose, one end (h) of the tubular sheath or outer cable (g) should be fixed, at a position near one extremity of one of the diagonals, to one of the parallel links (link (b2) in the case of FIG. 11), while one end of the inner cable or wire (j) should be fixed, at a position near the other extremity of the diagonal, to a fixing member (k) provided on a pivot pin by means of which the movable link (c) and the other of the parallel links (link (b1) in the case of FIG. 11) are pivotally connected together, so that the length of the diagonal can be varied by an axial sliding motion of the inner wire (j) relative to the outer cable or sheath (g). A less expensive single type control cable cannot be utilized for this purpose. Additionally, it is apparent that the single type control cable requires less force in operation than the double type control cable, because a certain frictional resistance is present in the axial sliding motion of the inner wire (j) relative to the outer cable (g).

Accordingly, it is an object of the invention to eliminate the above-discussed disadvantages in the prior art bicycle derailleurs.

Another object of the invention is to provide an improved, novel structure applicable not only to a rear derailleur but also to a front derailleur.

A further object of the invention is to provide an improved bicycle derailleur structure which permits protection of important component elements from rain and dust for a long span of life without maintenance.

A still further object of the invention is to provide an improved bicycle derailleur structure which permits a very simple and good appearance.

BRIEF DESCRIPTION OF THE DRAWINGS

FIG. 2 is a side elevation of FIG. 1;

FIG. 3 is a partial section showing the internal structure of a swing member of the derailleur;

FIG. 4A is an exploded perspective view showing component elements of the derailleur;

DESCRIPTION OF THE PREFERRED EMBODIMENTS

Figure 1:
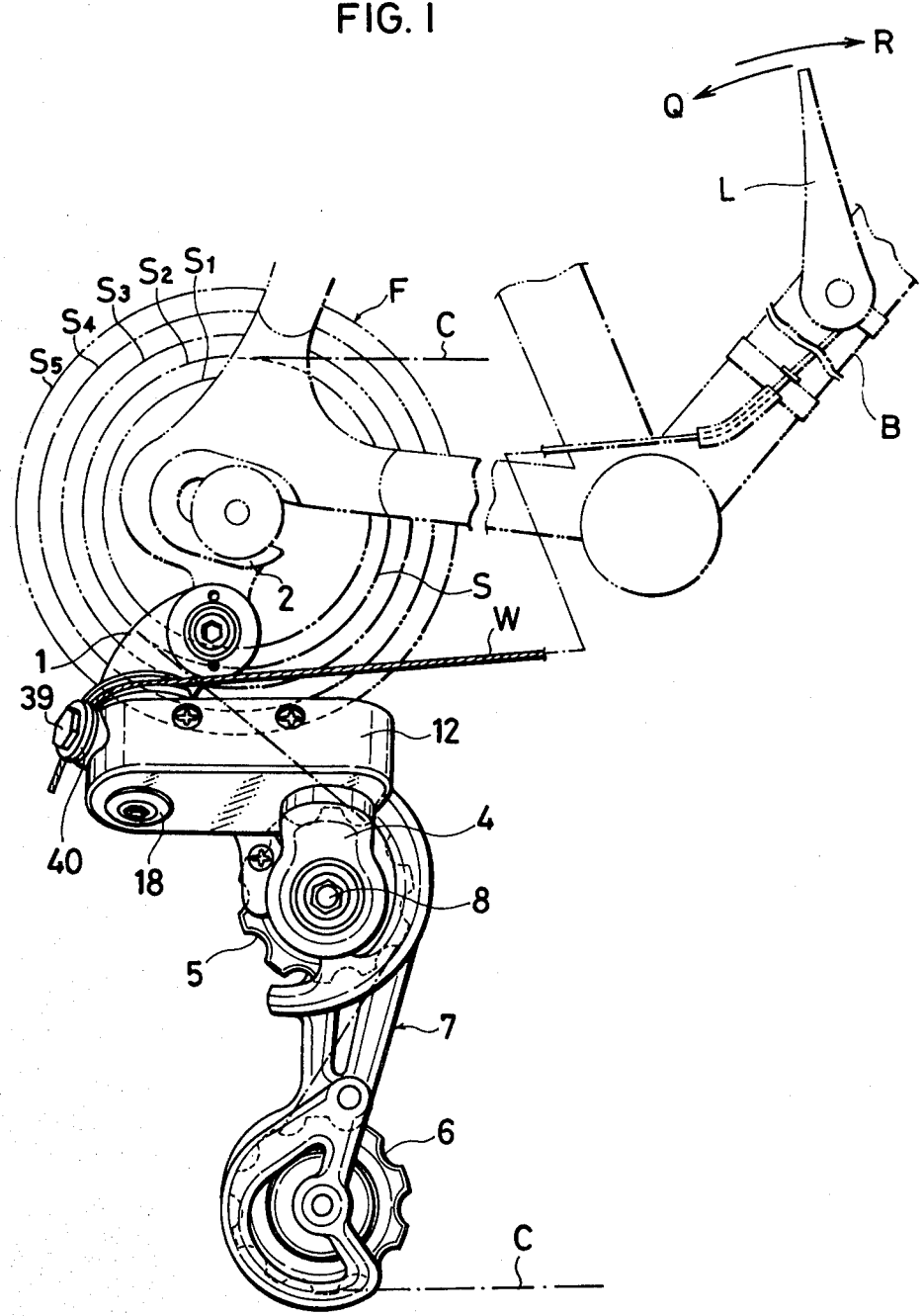
FIG. 1 is a perspective view of a rear derailleur, in operative position, according to the present invention, with associated bicycle parts shown in phantom lines.

Referring now to the drawings, in particular to FIGS. 1 to 8B showing a rear derailleur embodying the present invention, there is illustrated a derailleur structure comprising a stationary member 1 to be fixed to a known rear end plate 2 of a bicycle frame by means of appropriate known clamping members 37, 38, a box-shaped swing member 12 pivotally connected at one end to the stationary member 1, and a movable member 4 supported by the swing member 12 and supporting a known tensioner 7 which conventionally carries a guide roller 5 and a tension roller 6.

A drive chain C (shown in phantom line in FIG. 1) runs in engagement with the rollers 5, 6 and one of a plurality of sprockets S1, S2, S3 ... Sn of a multi-speed freewheel F. The tensioner 7 may be conventionally mounted, for example, to a guide roller supporting shaft 8 for pivotal movement about the shaft 8, so as to maintain the chain C in proper tension. The tensioner 7 is resiliently urged to turn in one direction (clockwise direction in FIG. 1) by means of a coil spring 9 disposed within the movable member 4, as shown in FIG. 2.

As will be readily apparent from the illustration, the rear derailleur according to the present invention is conspicuously different in style from any of the conventional rear derailleurs, since many of the component elements can be concealed within the box-shaped swing member 12.

The stationary member 1 has a downwardly extending cylindrical extension serving as a stationary shaft 10, while the movable member 4 has an upwardly extending shaft 11 fixed thereto or formed integral therewith. The box-shaped swing member 12 is pivotally supported at one end by the stationary shaft 10. The shaft 11 of the movable member 4 extends upwardly through the free end portion of the swing member 12, in parallel relation with respect to the stationary shaft 10 and relatively rotatable relation with respect to the swing member 12. However, the shaft 11 should be restricted from rotating about its own axis by means of a suitable restricting means, in order that the tensioner 7 supported by the movable member 4 can move in parallel relation with respect to an axis A (FIG. 2) of a bicycle rear wheel hub, so that a vertical plane P in which the guide and the tension rollers 5, 6 lie can be selectively positioned in the plane in which the selected one among the plurality of sprockets S1, S2, S3, . . . Sn lies, as shown in FIG. 2.

Figure 4B:
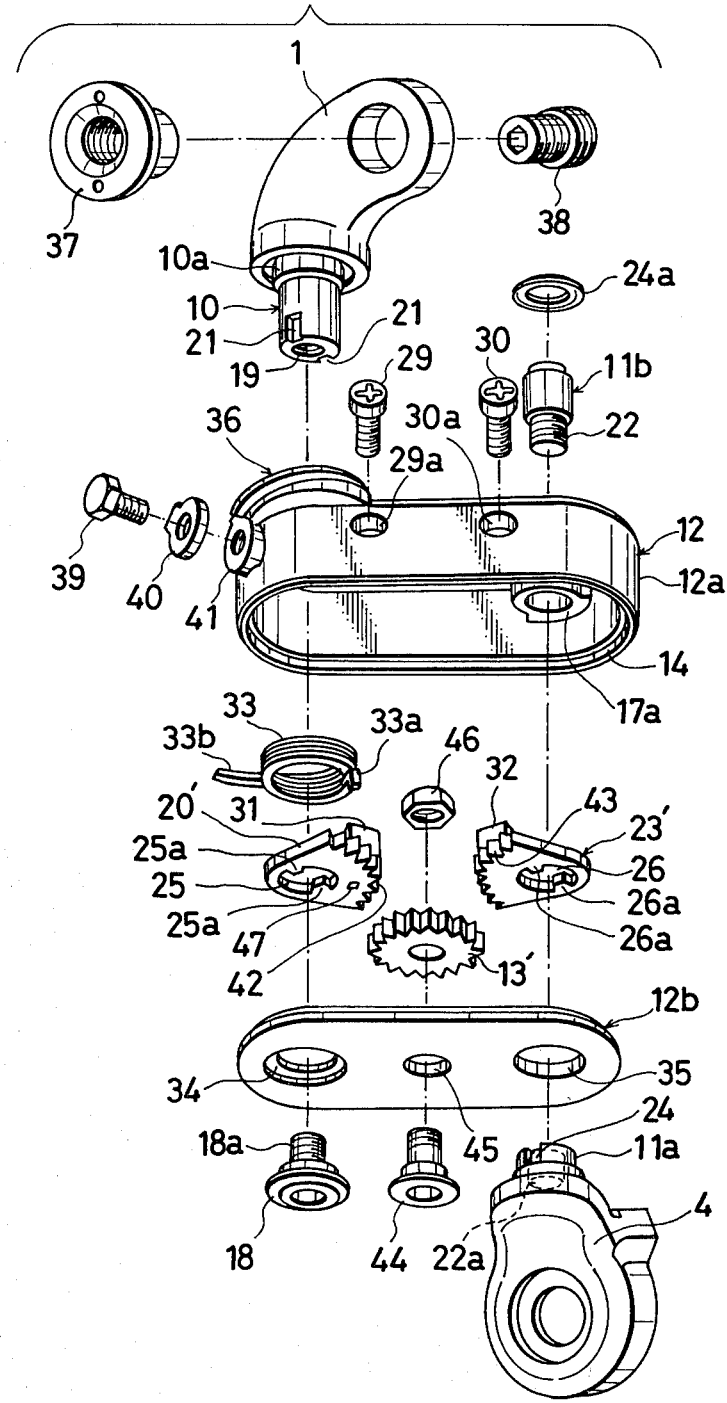
FIG. 4B is a similar view to FIG. 4A, showing component elements in a modified embodiment.

The restricting means may be realized in various ways. For example, it may be composed of a connecting bar 13 with an axial length equal to a distance between the shaft 10 and the shaft 11, and a pair of cooperating holed disks 20,23, as best shown in FIG. 4A. Or otherwise, the restricting means may be composed of a pinion 13' and a pair of cooperating holed, toothed disks 20', 23', as best shown in FIG. 4B.

In the embodiment as illustrated in FIGS. 1 to 4A, the shafts 10, 11, the connecting bar 13 with a pair of upwardly extending hooked ends 13a, 13b, and the pair of disks 20, 23 are all housed within the box-shaped swing member 12 which comprises a hollow body 12a having a top wall 15 and an open bottom 14, and a cover plate 12b which closes the open bottom 14. As best shown in FIG. 3, a cylindrical bore 16 is formed in one side of the top wall 15 for receiving a diametrically enlarged cylindrical base portion 10a of the shaft 10 therein so that the swing member 12 is rotatable about the cylindrical portion 10a. A further bore 17 is formed in the opposite side of the top wall 15 for rotatably receiving an upper or first shaft section 11b of the shaft 11. The wall which defines the bore 17 may be extended downwardly so as to form a sleeve 17a (FIG. 4A) for supporting the shaft 11 in a more stable manner.

The shaft 10 has an internally threaded axial hole 19 formed in the free end section thereof for engagement with a clamping screw 18 whose threaded shaft 18a extends through a hole 34 formed in the cover plate 12b into engagement with the internal threads of the axial hole 19.

The first holed disk 20 of the restricting means is mounted by insertion on the free end section of the shaft 10 in such a manner that the disk 20 is not rotatable about the shaft 10. For this purpose, the shaft end may be, for example, formed with a pair of notches 21 while the disk 20 may be formed with a hole 25 into which a pair of small projections 25a project for engagement with the pair of notches 21, resulting in that the disk 20 is restricted from rotating about the shaft 10. The disk 20 has a small bore 27 formed therein for relatively movable engagement with one hooked end 13a of the connecting bar 13 for the purpose to be hereinafter described. The disk 20 is formed at its upper side with an upwardly extending small projection 31 which is preferably triangular in cross section and cooperates with an adjustable stopper bolt 29 extending through a supporting hole 29a formed in the box-shaped body 12a into engagement with the projection 31 for restricting a swing motion of the member 12 within an adjusted range.

Figure 5A:
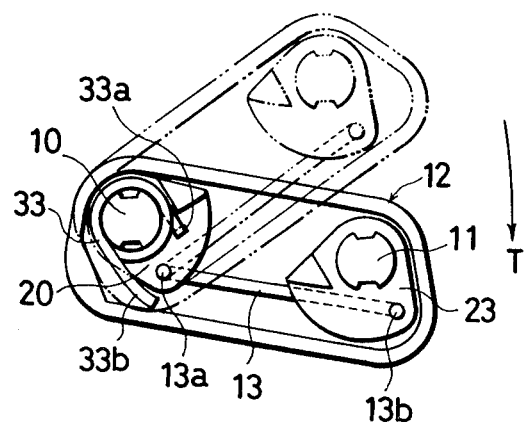
FIGS. 5A, 6, 7A and 8A are schematic illustration showing operation of the embodiment of FIG. 4A.
Figure 5B:
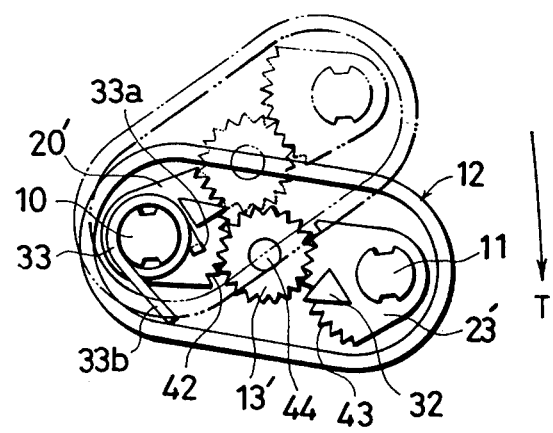
FIGS. 5B, 7B and 8B are schematic illustration showing operation of the embodiment of FIG. 4B.

A coil spring 33 is mounted on the shaft 10 and disposed between the top wall 15 of the swing member 12 and the disk 20, with its one end 33a engaged with the disk 20 at a bore 47 formed therein and its other end 33b with the internal wall of the swing member 12, so that the swing member 12 is spring-biased in the direction of an arrow T in FIG. 5A, that is, the direction toward the top gear side of the freewheel F.

For the convenience of assembly, the shaft 11 of the movable member 4 may be of two-piece construction consisting of the first shaft section 11a which is integral with the movable member 4 and extends upwardly through a hole 35 formed in the cover plate 12b, and a base or second shaft section 11b which is connectable to the first shaft section 11a, as best shown in FIG. 4A. More particularly, the first shaft section 11a has an internally threaded axial hole 22a, while the second shaft section has a reduced, threaded extension 22 which is engaged with the threaded axial hole 22a. When assembled, the shaft 11 is prevented from slipping out of the swing member 12 by means of a stop ring 24a conventionally fixed to the top end of the second shaft section 11b.

The second holed disk 23 of the restricting means is mounted on the first shaft section 11a in such a manner that the disk 23 is not rotatable about the shaft 11. For this purpose, the shaft section 11a may be, for example, formed with a pair of notches 24 (only one is shown in FIG. 4A) while the holed disk 23 may be formed with a hole 26 into which a pair of small projections 26a project for engagement with the pair of notches 24, resulting in that the disk 23 is restricted from rotating about the shaft 11. The disk 23 has a small bore 28 formed therein for relatively movable engagement with the other hooked end 13b of the connecting bar 13. The disk 23 is formed at its upper side with an upwardly extending small projection 32 which is preferably triangular in cross section and cooperates with an adjustable stopper bolt 30 extending through a supporting hole 30a formed in the box-shaped body 12a into engagement with the projection 32 for restricting a swing motion of the member 12 within an adjusted range, under cooperation with the other stopper bolt 29 engageable with the other projection 31.

The distance between the pair of hooked ends 13a, 13b of the connecting bar 13 should be so determined as to be equal to the distance between the shafts 10 and 11.

A modified embodiment as illustrated in FIG. 4B has a construction substantially same as that of the preceding embodiment already described in detail with reference to FIGS. 1 to 4A, except the restricting means adapted to restrict the shaft 11 of the movable member 4 from rotating about its own axis. Therefore, the detailed description regarding the common construction or common component elements designated in FIG. 4B by the identical reference numerals used in FIGS. 1 to 4A is omitted herein, and the description will be made in detail hereinafter, only with respect to the above-referred modified restricting means.

The modified restricting means as illustrated in FIG. 4B includes a pinion 13' and a pair of holed, toothed disks 20', 23'. The pinion 13' is rotatably supported by a support shaft 34 extending through a hole 45 formed in the cover place 12b into engagement with a nut 46 disposed within the box-shaped body 12a of the swing member 12. The disk 20' is fixed to the stationary shaft 10 while the other disk 23' is fixed to the first shaft section 11a of the movable member 4, in the same manner as described in the foregoing. The disk 20' has a toothed arcuate edge 42, while the other disk 23' has a similar toothed arcuate edge 43 with teeth of same pitch as those of the toothed edge 42. Both of the toothed edges 42, 43 are in mesh with the pinion 13' with the latter therebetween.

In operation, the stationary shaft 10 does not rotate since it is integral with the member 1 which is fixedly mounted to the bicycle frame. On the other hand, the swing member 12 is relatively rotatable with respect to both of the shafts 10, 11, and therefore, the swing member 12 moves about the shaft 10 when an external force is imparted to the swing member. However, the shaft 11 is restricted from rotating about its own axis by means of the restricting means, as described in detail in the foregoing.

Figure 6:
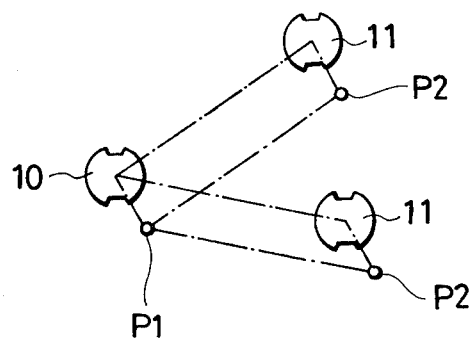

More particularly, in the embodiment as illustrated in FIGS. 1 to 4A, the shaft 10 and the shaft 11 are linked with each other by means of the connecting bar 13 having an axial length equal to the distance between the shafts 10 and 11, at spaced two points P1, P2 each spaced apart from the shafts 10, 11 respectively, as shown in FIG. 6. Accordingly, when the swing member 12 moves about the stationary shaft 10, the other shaft 11 moves along an arc of a circle defined by a radius equal to the distance between the shafts 10 and 11, without rotating about its own axis.

Also in the modified embodiment as illustrated in FIG. 4B, when the swing member 12 moves about the stationary shaft 10, the other shaft 11 moves along an arc of a circle defined by a radius equal to the distance between the shafts 10 and 11, because the shafts 10, 11 are linked together by means of the pinion 13' meshed with both of the toothed disks 20', 23', as shown in FIGS. 4B, 5B, 7B and 8B.

Thus, in either of the embodiments as illustrated in FIGS. 4A and 4B, the tensioner 7 carried by the movable member 4, which is integral with the shaft 11, moves substantially axially along the axis A (FIG. 2) of a bicycle rear wheel hub, with maintaining parallel relation with respect to the sprockets S1, S2, S3 ... Sn of the freewheel F.

Figure 9:
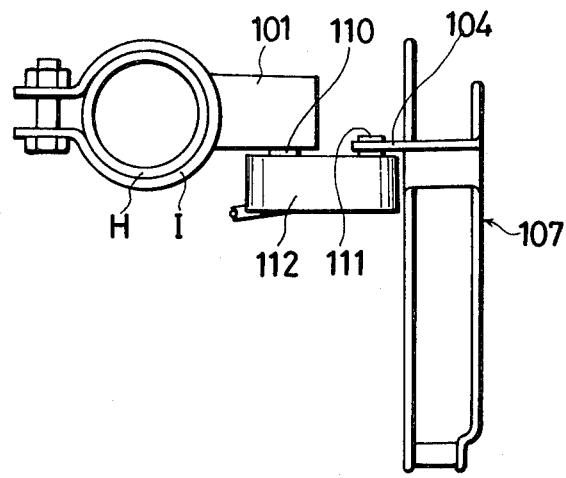
FIG. 9 is a schematic top plan view of a front derailleur, in operative position, according to the present invention.
Figure 10:
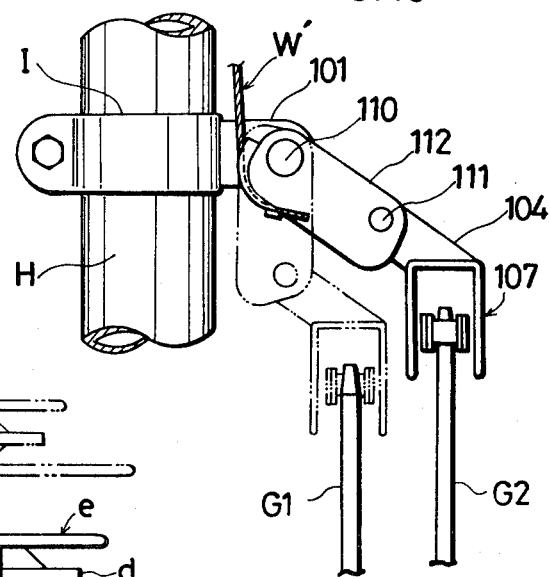
FIG. 10 is a side elevation of FIG. 9.
Figure 11:
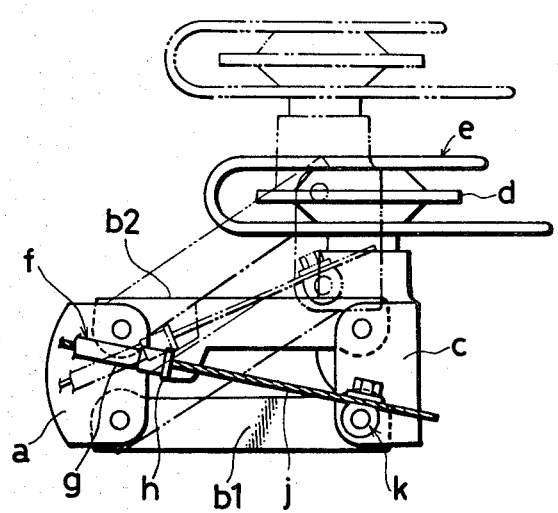
FIG. 11 is a schematic top plan view showing a typical example of a parallelogram linkage employed in the prior art rear derailleurs.

FIGS. 9 and 10 illustrate a front derailleur embodying the present invention, which has a stationary member 101 fixed to a bicycle frame tube (seat tube) H by means of a known fixing band I. The stationary member 101 has a stationary shaft 110 formed integral therewith. A spring-biased swing member 112 is pivotally supported at its one end by the stationary shaft 110. A known chain guide 107 having a pair of spaced, parallel guide plates is fixedly connected to a movable member 104 supported by a shaft 111 which extends through the free end portion of the swing member 112 in parallel relation with respect to the stationary shaft 110 and in relatively rotatable relation with respect to the swing member 112. The shaft 111 is restricted from rotating about its own axis by means of a suitable restricting means. Consequently, when the swing member 112 pivotally moves about the stationary shaft 111, the shaft 111 moves along an arc of a circle defined by a radius equal to a distance between the shaft 110 and the shaft 111, without rotating about its own axis.

In the embodiment of FIGS. 9 and 10, the specific construction and arrangement of each of the shafts 110, 111, the restricting means, the swing member 112, and other essential elements may be substantially the same in principle as those employed in the preceding embodiments described in detail hereinbefore, and therefore, the detailed description thereof is omitted herein. It is believed that anyone skilled in the art can carry out the invention of FIGS. 9 and 10 in view of the invention of FIGS. 1 to 4B.

In operation, when a control cable W' is pulled or released, the swing member 112 is pivotally moved about the stationary shaft 110 from the solid line position to the phantom line position or vice versa, with the shaft 111 restricted from rotating about its own axis, as shown in FIGS. 9, 10, resulting in that the chain guide 107 supported by the shaft 111 by way of the member 104 can move laterally over the gears G1, G2 ... Gn of a multi-speed chain wheel, with maintaining the guide plates in parallel relation with respect to the side surfaces of the gears G1, G2 ... Gn of the chain wheel, to effect the chain-shifting over one selected gear of the chain wheel.

According to the present invention, it is possible to design the swing member 12/112 so as to be box-shaped for housing and concealing the shafts 10/110, 11/111, the restricting mechanism, a coil spring 33, and other component elements therein, with the result that water, dust and the like are prevented from intrusion into the swing member 12/112. It is also possible to enclose grease or the like lubricant in the swing member 12/112 for smooth operation and better maintenance. As a result, the derailleur of the present invention can enjoy a longer span of life as compared with the conventional derailleur whose link members, springs and other component element are all exposed to rain and dust.

Further, according to the present invention, operation of the derailleur can be effected by means of a single type cable. Particularly with the conventional parallelogram type rear derailleur, the double type cable known as a Bowden cable, which consists of an outer sheath and an inner wire, is required in order to forcibly deform the parallelogram linkage. More particularly, as illustrated in FIG. 1, a single type cable W is fixedly connected at its one end to a control lever L mounted on a bicycle frame tube (down tube) B and also fixedly connected at its the other end to the swing member 12 by means of known clamping members 39, 40, 41 (FIGS. 4A and 4B), preferably being guided by a suitable guide such as a reel portion 36 formed with the body 12a of the swing member, so that a direct connection between the lever L and the rear derailleur is provided. Since the swing member 12 is spring-biased by means of the coil spring 33 so as to turn in one direction (direction of the arrow T in FIGS. 8A and 8B), when the cable W is released in the direction of the arrow N by operation of the level L in the direction of the arrow R, the swing member 12 moves from its solid line position to its phantom line position in FIGS. 8A and 8B. On the other hand, when the cable W is pulled in the direction of the arrow M by operation of the lever L in the direction of the arrow Q, the swing member 12 moves from its solid line position to its phantom line position in FIGS. 7A and 7B. In this way, swing member 12 can pivotally move about the shaft 10 in the direction of the arrow T (FIGS. 8A, 8B) or alternatively in the direction of the arrow U (FIGS. 7A, 7B) by the simple operation of the control lever L, resulting in that the speed change operation can be effected in a very simple manner with less force as compared with the conventional device.

Figure 7A:
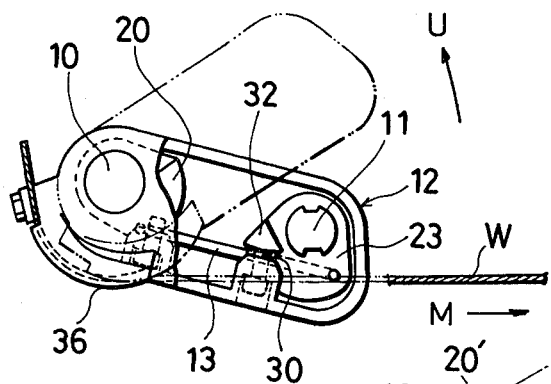
Figure 7B:
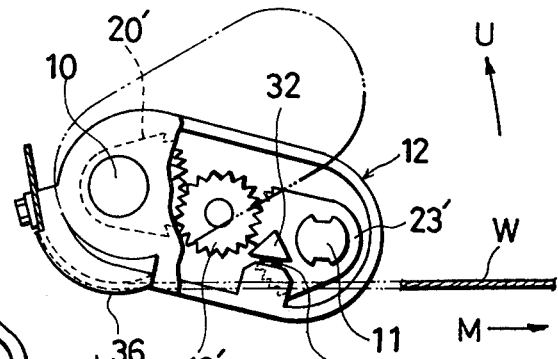
Figure 8A:
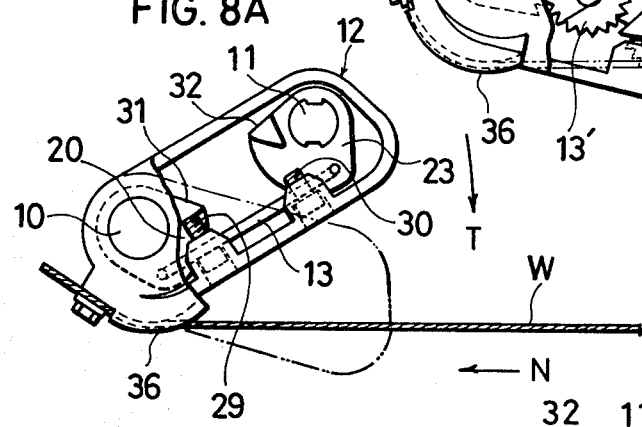
Figure 8B:
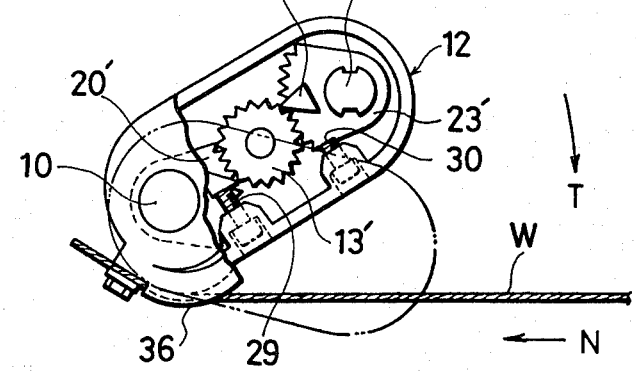

Further, according to the present invention, the angular range of pivotal movement of the swing member 12/112 can be easily adjusted by means of the stopper bolts 29, 30. More particularly, as shown in FIGS. 7A and 7B, the pivotal movement of the swing member toward the top gear can be easily restricted within a desired angular range merely by adjustably screwing or unscrewing the top-gear side stopper bolt 30 whose forward end is in contact with projection 32 of the disk 23/23'. On the other hand, as shown in FIGS. 8A and 8B, the pivotal movement of the swing member toward the low gear can be easily restricted within a desired angular range merely by adjustably screwing or unscrewing the low-gear side stopper bolt 29 whose forward end is in contact with the projection 31 of the disk 20/20'.

The present invention being thus described, it will be obvious that same may be varied in many ways. For instance, the swing member 12/112 may be formed in various configuration and should not be limited to the illustrated box-shaped structure. If desired, the cover plate 12b may be omitted. It is possible to mount the coil spring 33 not on the shaft 10/110 but on the shaft 11/111. It is also possible to arrange the spring 33 so as to urge the swing member 12/112 not in the direction of the arrow T (FIGS. 5A, 5B) but in the direction of the arrow U (FIGS. 7A, 7B). The disks 20/20', 23/23' may be formed in various shapes, and the positions of the projections 31, 32 on those disks may be varied in many ways. As a matter of course, the cross section of the projections 31, 32 should not be limited to a triangular shape. The reel portion 36 may be omitted or replaced by another form of suitable guide means located in an appropriate place of a bicycle frame. Further, the restricting means for restricting the shaft 11/111 from rotating about its own axis may be achieved for example by an endless belt, chain or wire which is so designed as to be in engagement with both of the shafts 10/110, 11/111. Such variations are not to be regarded as a departure from the spirit and scope of the present invention, and all such modifications as would be obvious to one skilled in the art are intended to be included within the scope of the following claims.

I claim:
1. A bicycle derailleur comprising
a stationary member to be fixed to a bicycle frame,
a first shaft integral with and extending from said stationary member,
a spring-biased swing member pivotally supported at one end by said first shaft,
a second shaft supported by said swing member at a position spaced apart from said first shaft and extending in parallel relation with respect to said first shaft and in relatively rotatable relation with respect to said swing member,
a movable member fixedly mounted to said second shaft,
a chain guide means carried by said movable member, and
a restricting means for restricting said second shaft from rotating about its own axis during pivotal movement of said swing member about said first shaft.

2. The derailleur as defined in claim 1, wherein said swing member is substantially box-shaped for housing at least said first and second shafts, and said restricting means therein.

3. The derailleur as defined in claims 1 or 2, wherein said swing member includes a hollow body having a top wall and an open bottom, and a cover plate for closing said open bottom.

4. The derailleur as defined in claim 3, wherein said swing member is formed with a control cable guiding means.

5. The derailleur as defined in claim 4, wherein said swing member is provided with a control cable fixing means.

6. The derailleur as defined in claims 1 or 2, wherein said restricting means comprises a connecting bar whose one end is linked to said first shaft and whose other end is linked to said second shaft.

7. The derailleur as defined in claims 1 or 2, wherein said restricting means comprises a first toothed disk rigidly secured to said first shaft, a second toothed disk rigidly secured to said second shaft, and a pinion which is in mesh with both of said first and second disks.

8. The derailleur as defined in claims 1 or 2, wherein said restricting means comprises an endless member which is in engagement with both of said first and second shafts.

9. The derailleur as defined in claim 1, wherein an adjustable stopper means is provided for restricting said pivotal movement of said swing member about said first shaft.

10. The derailleur as defined in claim 9, wherein said adjustable stopper means comprises a first stopper bolt operatively supported by said swing member so as to act upon said first shaft, and a second stopper bolt operatively supported by said swing member so as to act upon said second shaft.

11. The derailleur as defined in claim 1, wherein said chain guide means is a tensioner having a guide roller and a tension roller rotatably supported thereby.

12. The derailleur as defined in claim 1, wherein said chain guide means is a chain guide having a pair of spaced, parallel guide plates.

* * * * *

UNITED STATES PATENT AND TRADEMARK OFFICE
CERTIFICATE OF CORRECTION

PATENT NO. : 4,469,479

DATED : September 4, 1984

INVENTOR(S) : Nobuo OZAKI

It is certified that error appears in the above-identified patent and that said Letters Patent is hereby corrected as shown below:

On the title page:

<u>In the Heading of the Patent:</u>

After section [22], please insert the following:

-- [30]    Foreign Application Priority Data

Sep. 28, 1981 [JP]   Japan .......... 56-153328
   Oct. 15, 1981 [JP]   Japan .......... 56-165046
   Oct. 15, 1981 [JP]   Japan .......... 56-165047 --

Signed and Sealed this

Nineteenth Day of February 1985

[SEAL]

Attest:

DONALD J. QUIGG

Attesting Officer    Acting Commissioner of Patents and Trademarks